United States Patent
Crawford et al.

(10) Patent No.: US 7,792,664 B1
(45) Date of Patent: Sep. 7, 2010

(54) WEATHER MODEL PREDICTOR

(75) Inventors: Todd Crawford, Hudson, NH (US);
Peter P. Neilley, Hollis, NH (US)

(73) Assignee: WSI, Corporation, Andover, MA (US)

( * ) Notice: Subject to any disclaimer, the term of this patent is extended or adjusted under 35 U.S.C. 154(b) by 928 days.

(21) Appl. No.: 11/495,300

(22) Filed: Jul. 28, 2006

(51) Int. Cl.
*G06G 7/48* (2006.01)
*G01W 1/00* (2006.01)

(52) U.S. Cl. .............................. 703/6; 702/3
(58) Field of Classification Search ............ 703/6; 702/3; 706/62
See application file for complete search history.

(56) References Cited

U.S. PATENT DOCUMENTS

| | | | |
|---|---|---|---|
| 5,373,456 | A | 12/1994 | Ferkinhoff |
| 5,444,820 | A | 8/1995 | Tzes |
| 6,289,777 | B1 | 9/2001 | Hartmann |
| 6,535,817 | B1 | 3/2003 | Krishnamurti |
| 6,577,962 | B1 | 6/2003 | Afshari |
| 6,581,008 | B2 | 6/2003 | Intrilligator |
| 6,584,447 | B1 | 6/2003 | Fox et al. |
| 6,963,853 | B1 | 11/2005 | Smith |
| 2003/0023466 | A1 | 1/2003 | Harper |
| 2004/0143396 | A1* | 7/2004 | Allen et al. ................ 702/3 |
| 2004/0215394 | A1 | 10/2004 | Carpenter et al. |
| 2004/0215529 | A1 | 10/2004 | Foster et al. |
| 2006/0167784 | A1* | 7/2006 | Hoffberg ................ 705/37 |
| 2007/0159355 | A1* | 7/2007 | Kelly et al. ................ 340/905 |
| 2007/0244644 | A1* | 10/2007 | Tanahashi .................... 702/3 |

OTHER PUBLICATIONS

Miller et al. "Parametrization and Influence of Subgridscale Orography in General Circulation and Numerical Weather Prediction Models", 1987., Meteorology and Atmospheric Physics 40, pp. 84-109.*
Thorpe, Alan J., "Weather Forecasting: A Centenary Perspective", Weather, Dec. 2004, vol. 59, No. 12, p. 332-335.
Altalo, Mary, et al, "Turning Weather Forecasts into Business Forecasts", Environmental Finance, May 2004, 5 pgs.

* cited by examiner

*Primary Examiner*—Paul L Rodriguez
*Assistant Examiner*—Eunhee Kim
(74) *Attorney, Agent, or Firm*—Carlineo, Spicer & Kee, LLC

(57) ABSTRACT

A computer-implemented method of predicting an output of a model includes receiving output data from a first run of a target predictive model. One or more additional sets of output data is received from runs of one or more alternate predictive model. The alternate predictive models predict parameters that relate to the output data of the first predictive model. A future output of a second run of the target predictive model is predicted based on the output data from the first run of the target predictive model and one or more sets of additional output data from runs of the alternate prediction model.

53 Claims, 7 Drawing Sheets

WEATHER MODEL PREDICTOR

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

The patent or application file contains at least one drawing executed in color. Copies of this patent or patent application publication with color drawing(s) will be provided by the Office upon request and payment of the necessary fee. In the Drawings.

DETAILED DESCRIPTION

Figure 1:
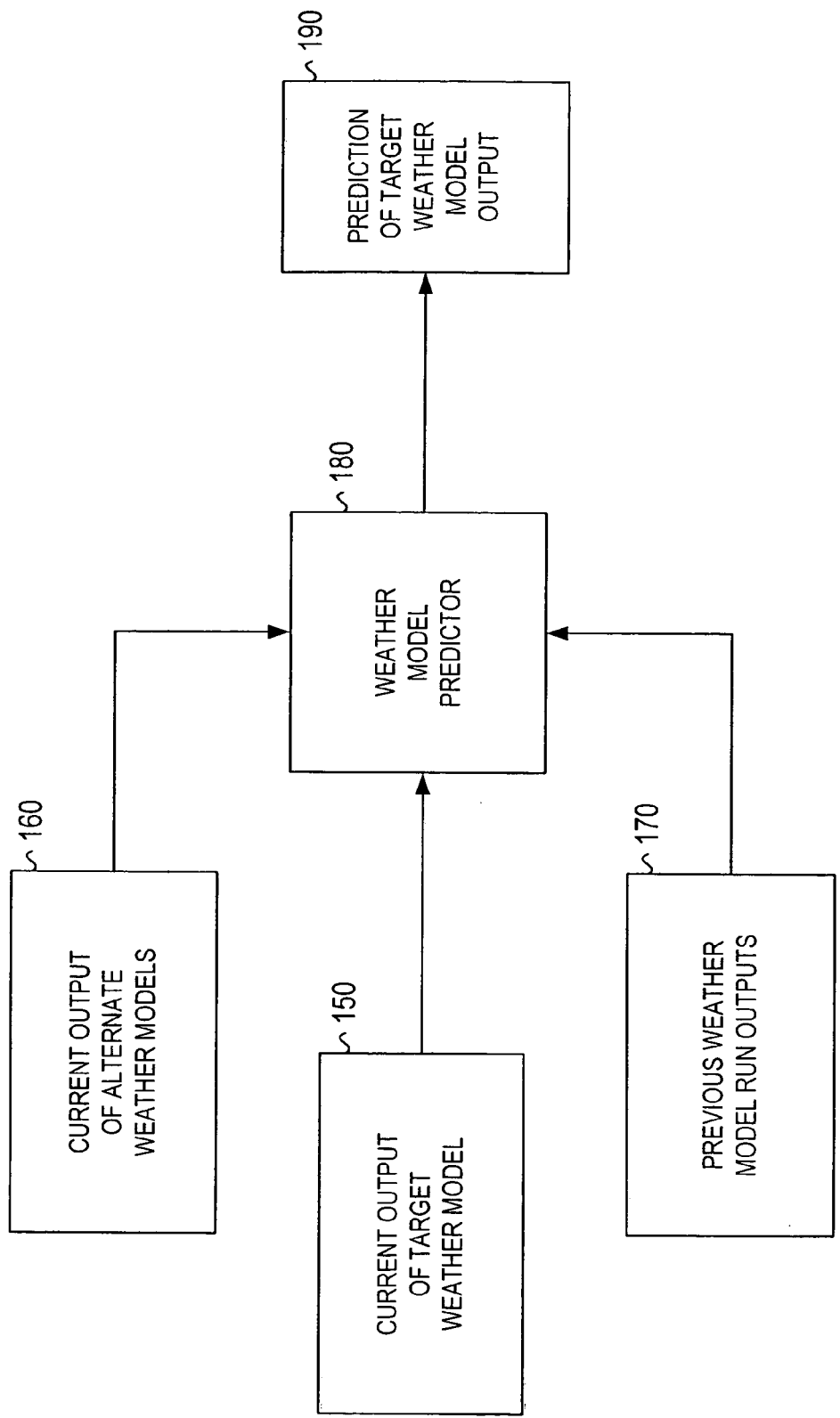
FIG. 1 is a block diagram that includes the weather model predictor in accordance with an embodiment of the present invention.

Certain terminology is used herein for convenience only and is not to be taken as a limitation on the embodiments of the present invention. In the drawings, the same reference letters are employed for designating the same elements throughout the several Figures.

The words "right", "left", "lower" and "upper" designate directions in the drawings to which reference is made. The words "inwardly" and "outwardly" refer to directions toward and away from, respectively, the geometric center of the weather model predictor and designated parts thereof. The terminology includes the words above specifically mentioned, derivatives thereof and words of similar import.

As the energy and commodity markets have been deregulated and as market participants have quantified the impact of weather on both supply and demand, energy and commodity market prices have become increasingly sensitive to weather and weather forecasts. For example, with weather-sensitive financial instruments, such as natural gas or weather derivatives, the prices are dependent upon, among other things, medium-range (1-2 weeks) weather forecasts. Medium-range forecasts are provided by various dynamical modeling systems and by numerous government and private sector entities. For example, the Global Forecast System (GFS model) model is run by the United States National Weather Service (NWS) four times daily and forecasts global weather conditions for up to 384 hours in the future. The NWS also runs the North American Mesoscale (NAM) model four times a day out to 84 hours, and the European Centre for Medium-Range Weather Forecasts runs the ECMWF medium-range model twice a day out to 240 hours. Each solution for the various models is generally available to all market participants at approximately the same time, negating any competitive advantage any one participant may have over another by receiving the model solution earlier. The GFS model results, for example, are distributed freely on the internet. The morning high-resolution, or operational, run of the GFS model is initialized at 1200 UTC (Coordinated Universal Time) and is typically available by 11 AM-noon Eastern time, which coincides with peak trading volume in the natural gas market. Due to the timing of the availability of the morning operational GFS model results, natural gas traders tend to react particularly strongly to the results of this run. For example, if the morning operational GFS model result is much colder than the result of the overnight GFS model run, natural gas prices will usually increase in anticipation of larger demand during the colder weather. Thus, the ability to accurately predict the output of morning operational GFS model run would provide a competitive advantage in the market place.

According to an embodiment of the present invention, a weather model predictor is used to predict a result of a future run of a predictive weather model before the result of that run of the weather model is available. Using the GFS model as an example, the weather model predictor can be run at 9:00 AM on Tuesday morning to predict the result of the 1200 UTC morning operational GFS model run that will be available later in the morning, where the weather model predictor result provides a prediction of the result of the Tuesday morning GFS model at least an hour before the actual Tuesday morning GFS model results will be available to the public.

For simplicity, convenience and to exemplify an embodiment of the present invention only, the weather model predictor is described herein generally with reference to commodity trading and the Global Forecast System (GFS model) model. It is understood by those skilled in the art that the weather model predictor may have applicability in any market or any activity that is impacted by weather and weather forecasts. Accordingly, the examples presented herein are not intended to limit any embodiments of the present invention.

In one embodiment, referring to FIG. 1, the weather model predictor 180 receives current output data from an operational run of the target model 150, current output data from runs of the alternate models 160, and output data from previous runs of the target and/or alternate models 170. The weather model predictor 180 utilizes the previous run output data from the target and alternate models in order to determine statistical relationships between the target and alternate model outputs that allow for prediction of results of a future run of a target model 190 before the results of the next target model run are available. For example, if the output of a temperature prediction from target Model A is different than the output of a temperature prediction from alternate Model B for a first run, and the temperature prediction of Model A moves towards the temperature prediction of Model B on succeeding runs 80% of the time, this predictive pattern can be used to predict the output of Model A for a future run of Model A when both the output of Model A and B are known for the current model run, without knowledge of the details of Model A or Model B.

In an embodiment, a prediction of the future output of a target model can be determined from a current output data of the target model, current output data from one or more alternate models, previous output data from the target and/or alternate model, and variable factors which may be in the form of a vector, set, array, n-dimensional matrix, or any other generally known data format. Variable factors are any relevant parameters that make the weather model predictor 180 output as accurate as possible compared to the actual target model output. These variable factors may include extended regional weather phenomenon that are known to affect the output of the weather model predictor 180. For example, the existence of an El Nino event may be included as a variable factor in the weather model predictor 180. Another example of a variable factor is a tuning variable which is described in more detail below.

A prediction of the future output of a target model is obtained by transforming the current output data of the target model, current output data from one or more alternate models, previous output data from the target and/or alternate model, and the variable factors using one or more methods, generally known to those skilled in the art, such as regression, fuzzy logic or neural network progression. The weather model predictor 180 may utilize one or more transformation methods, such as those previously described in order to predict the future output of a target model. The prediction of the future output of a target model has an error that is related to the difference between the predicted target model output and the actual target model output. A function can be determined that provides a measure of the error between the predicted target model output and the actual target model output, this function typically being referred to as the error function. As an example, the square of the error in the prediction can be used as the error function, although other definitions of error can be utilized to establish an error measurement. Once the error function has been established, the weather model predictor 180 can minimize the error of subsequent predictions by adjusting tunable variables.

The tunable variables are used to make the prediction of the future output of a target model as accurate as possible compared to the actual target model output. The use of tunable variables is well known in the art. One example of a tunable variable is a weighting coefficient. Weighting coefficients may be used in the weather model predictor 180 to adjust the contribution for an alternate model in the weather model predictor algorithm, according to the accuracy for which an alternate model is known to track a future output of the target model for which the weather model predictor 180 is trying to predict. For example, three alternate models, whose output data is used by the weather model predictor 180, may predict a temperature for the some time in the future. The three values of the predicted temperature may not agree with each other. In order for the weather model predictor 180 to produce the most accurate prediction for the future output of the target model, each of these alternate model predicted temperatures may be assigned a weighting coefficient in the weather model predictor algorithm so that the output of the weather model predictor 180 most accurately agrees with the output of the operational run that it is trying to predict. In one embodiment, the weighting coefficients are determined based on the historical output data from the target or alternate models that is used by the weather model predictor 180. Other types of tunable variable may be used without departing from the embodiments of the present invention.

A number of techniques can be utilized to adjust the tunable variable(s) to find a minimum in the error function. In one embodiment the gradient of the error function is determined and minimization of the error is determined by calculating values for the tunable variables (i.e., finding the point in multi-dimensional space that minimizes the error function) through a minimization algorithm such as steepest decent or a conjugate gradient method. The steepest decent method utilizes the gradient to take small steps down the gradient, whereas the complex conjugate method proceeds down the gradient in directions other than the direction previously traversed. Other methods to minimize the error function and determine an appropriate set of values for the tunable variables are known to those skilled in the art and may or may not be based on the use of the gradient of the error function. Once an applicable method is selected, the weather model predictor 180 can choose the tunable variable(s) accordingly, using techniques (e.g., steepest descent, complex conjugate, etc.) most applicable to the selected method for minimizing the error.

Figure 2:
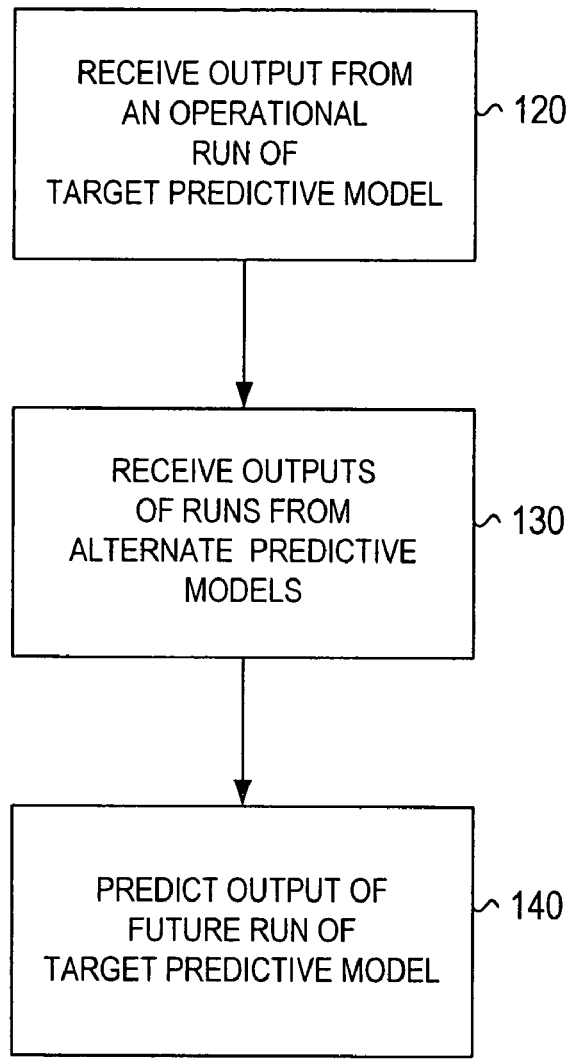
FIG. 2 is a flow diagram in accordance with the weather model predictor of FIG. 1.

Referring to FIG. 2, in order to predict the output of a future operational run of a target predictive model, the output data from a first operational run of the target predictive target model is received 120. Output data from alternate predictive models is also received 130. These alternate predictive models predict parameters that are related to the output of the predictive target model. In one embodiment, the target predictive model and the alternate predictive models are weather models, and the outputs of the operational runs of the target predictive model and the alternate predictive models are predicted future weather conditions. It is appreciated by one skilled in the art that the target model is not limited to any one specific model, such as the GFS model, but the target model can be any model for which a predictive output is desired. Based on the outputs of the target model and the alternate models, the weather model predictor 180 predicts an output for a future operational run of the target predictive model 140. The predicted output can be either a predicted change in magnitude and/or direction of the output of a future operational run of the target model relative to the output of the first operational run of the target model, or it may be a prediction of the actual value that a will be produced by a future operational run of the target model.

In one embodiment, it is not necessary that the weather model predictor 180 have knowledge of the details used in the target and alternate models to produce output predictions; the output of the models themselves is sufficient as an input into the weather model predictor 180. Similarly, it is not necessary for the weather model predictor 180 to use current observable weather data for predicting the future results of operational runs of the target model.

Those skilled in the art will understand that a high resolution run of a predictive weather model may take several hours to complete. Since an operational model run takes a finite time to complete, the full set of output data for that run will not be available for some time after the initialization of the model run. In an embodiment, the weather model predictor 180 can be run between the time that the operational run of the target model has been initialized and the time that the output of the operational run of the model is available. In an alternate embodiment, since the second run of the operational model takes a finite period of time to complete and transmit, one skilled in the art would recognize that the subset of data received from a second run of the operational model can be used to predict portions of that second run not yet complete or transmitted.

Figure 3:
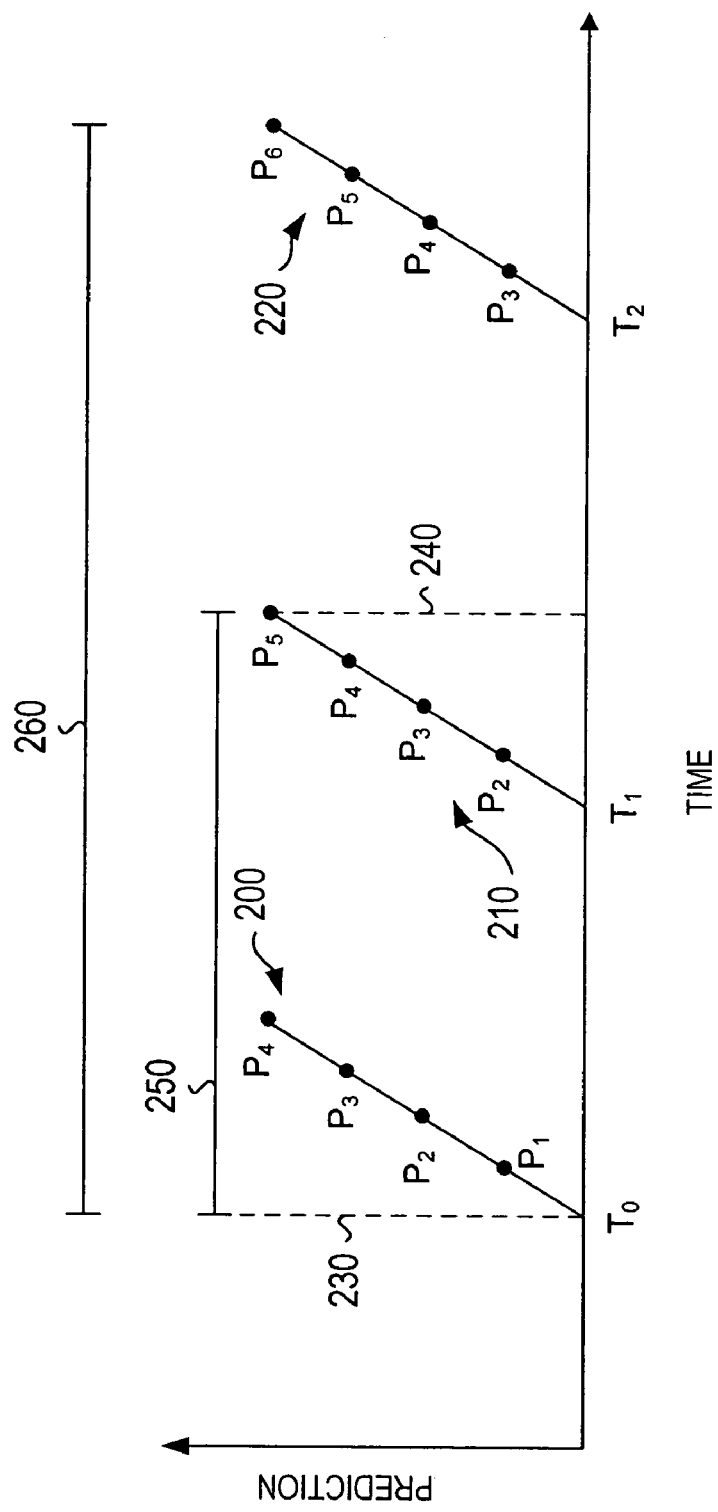
FIG. 3 is an example of using the weather model predictor in FIG. 1 relative to initializing a target weather model.

Referring generally to FIG. 3, an operational run of a target model produces a series of output data sets, labeled in FIG. 3 as $P_1$, $P_2$, $P_3$, etc. Each set of output data corresponds to a set of predicted future weather conditions for a single time in the future. For example, if a model is run every twelve hours and produces weather predictions at 12-hour intervals for the next 10 days, then an operational run of that model at any time will produce twenty sets of output data, each set of output data being a prediction of the weather conditions for a particular time. In FIG. 3, a model run 200 is initialized at $T_0$ and produces a series of output data sets $P_1$, $P_2$, $P_3$, and $P_4$, where $P_1$ is the prediction of conditions at $T_1$ (which is the next time the model is initialized), $P_2$ is the prediction of conditions at $T_2$ (which is the model initialization time after $T_1$), etc. At time $T_1$, a second operational run 210 of the target model produces an updated prediction of $P_2$, $P_3$, and $P_4$. $P_1$ is no longer predicted as it represents the current set of conditions. A new series of output data $P_5$ is added to predict next set of conditions after $P_4$. If the weather model predictor 180 is to predict the output of the operational run at $T_1$ using model output from $T_0$, it can be run at any time after the model output from $T_0$ starts to become available 230 up to just before the output of $T_1$ is available 240, denoted in FIG. 3 by the bar 250, even after operational model for $T_1$ has already been initialized. One skilled in the art will understand that since output data from alternate models (not shown in FIG. 3) are used by the weather model predictor 180, then running the weather model predictor 180 after those output data are available will produce a more accurate prediction of the output at $T_1$ by the weather model predictor 180. It is also possible to predict the output 220 for an operational run at $T_2$ using the output from the $T_0$ model during the time interval denoted by bar 260, but that prediction may not be very accurate. Furthermore, if the weather model predictor is run after the operational run of the model is initialized at T1, but before the complete set of new output data for that operational run is received, then one skilled in the art will recognize that using a subset of output data of the operational run initialized at T1 available before the completion of the run to predict the output for the portion of the run not yet complete or received can further increase the accuracy of the weather model predictor.

Figure 4:
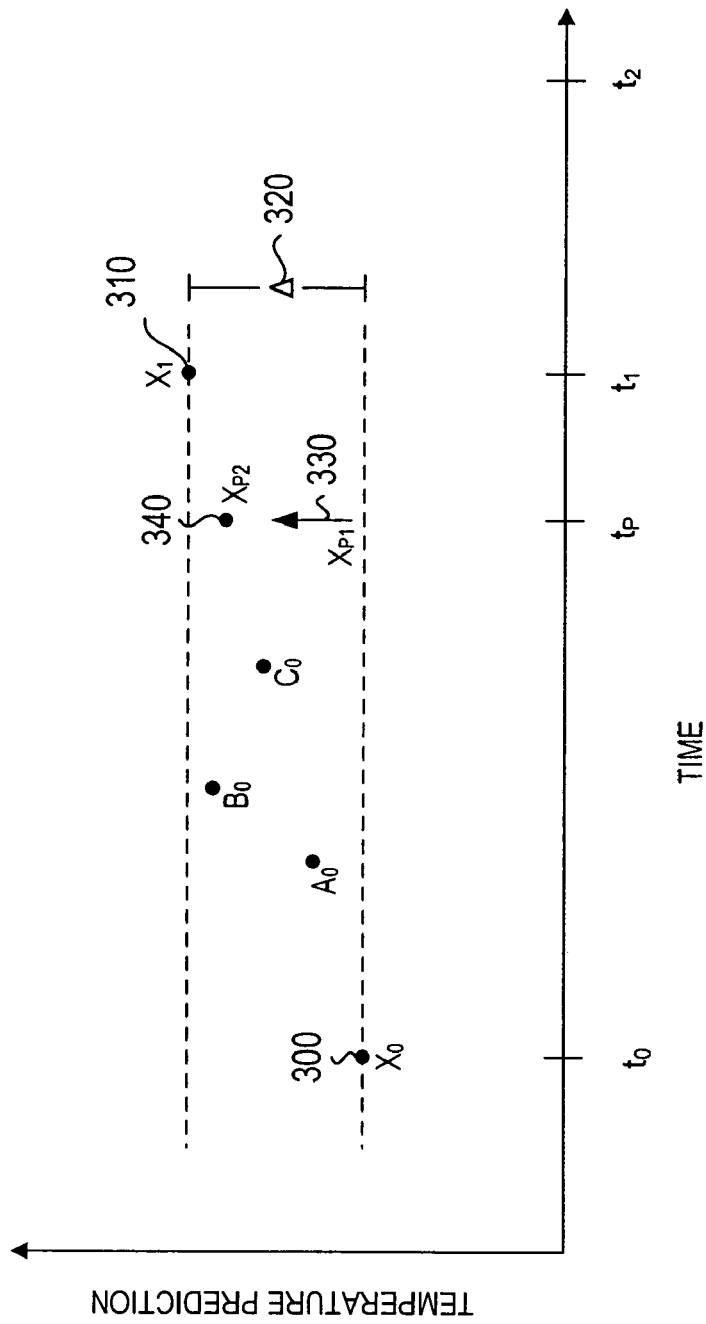
FIG. 4 is an example of predicting a future output of a target weather model with the weather model predictor of FIG. 1.

An example of predicting a future output by the weather model predictor 180 is shown in FIG. 4 with reference to a prediction of temperature. At time $t_0$, a temperature prediction $X_0$ 300 is made by Model X for some future time $t_2$. At time $t_1$, Model X makes a revised temperature prediction $X_1$ 310 for time $t_2$. The difference between the predictions of the temperature at $t_2$ by Model X initialized at times $t_0$ and $t_1$ is denoted by $\Delta$ 320. Alternate models A, B, and C are initialized before, at, or after time $t_0$, but before the time $t_P$ when the weather model predictor 180 is run. Models A, B, and C predict temperature of $A_0$, $B_0$, and $C_0$, respectively for future times near $t_2$. At time $t_P$, which is before time $t_1$, the weather model predictor 180 is run to predict the temperature that Model X will output from an operational run initialized at time $t_1$ using the outputs from Model X at $t_0$, and the outputs of Models A, B, and C. In one embodiment, the weather model predictor 180 predicts the actual temperature prediction $X_{P2}$ 340 that Model X, initialized at $t_1$, will predict for time $t_2$. In an alternate embodiment, the weather model predictor 180 will predict at $t_P$ an indication of the expected direction of the change $X_{P1}$ 330 of the prediction $X_0$ 300 at $t_0$ relative to the output prediction $X_1$ 310 at time $t_1$. In other words, the weather model predictor 180 will determine if the prediction $X_1$ 310 is higher or lower than the prediction $X_0$ 300, or alternately, if $\Delta$ 320 is positive (warmer forecast) or negative (cooler forecast). In one embodiment, the direction of the expected change in the predicted output may be used if the confidence level of the weather model predictor 180 prediction for an actual output of the future run of the model is low, but the confidence level of predicting the direction of change of the future output is high.

In one embodiment of the present invention, the output of the weather model predictor 180 is used by the commodity trader or broker to predict a change in the demand or price for a commodity or financial instrument. It is understood by one skilled in the art that commodity trading is sensitive to the output of certain predictive weather models, such as the morning operational run of the GFS model. Since the output of such models is generally available to all at the same time, a high-confidence prediction of the output of a predictive model, such as the morning GFS Model, can provide an advantage to a commodity trader or broker in anticipating the demand or price for that commodity or financial instrument. Some examples of commodities 716 are energy commodities, such as natural gas, oil, electricity (see FIG. 7). Those skilled in the art will recognize that change in demand or price for any weather-dependent commodity can be analyzed using the output of the weather model predictor 180. Once a change in demand or price for the commodity 716 has been predicted, a commodity trader or broker can utilize this information and initiate business transactions in advance of competitors waiting for the actual output of the predictive model.

Figure 7:
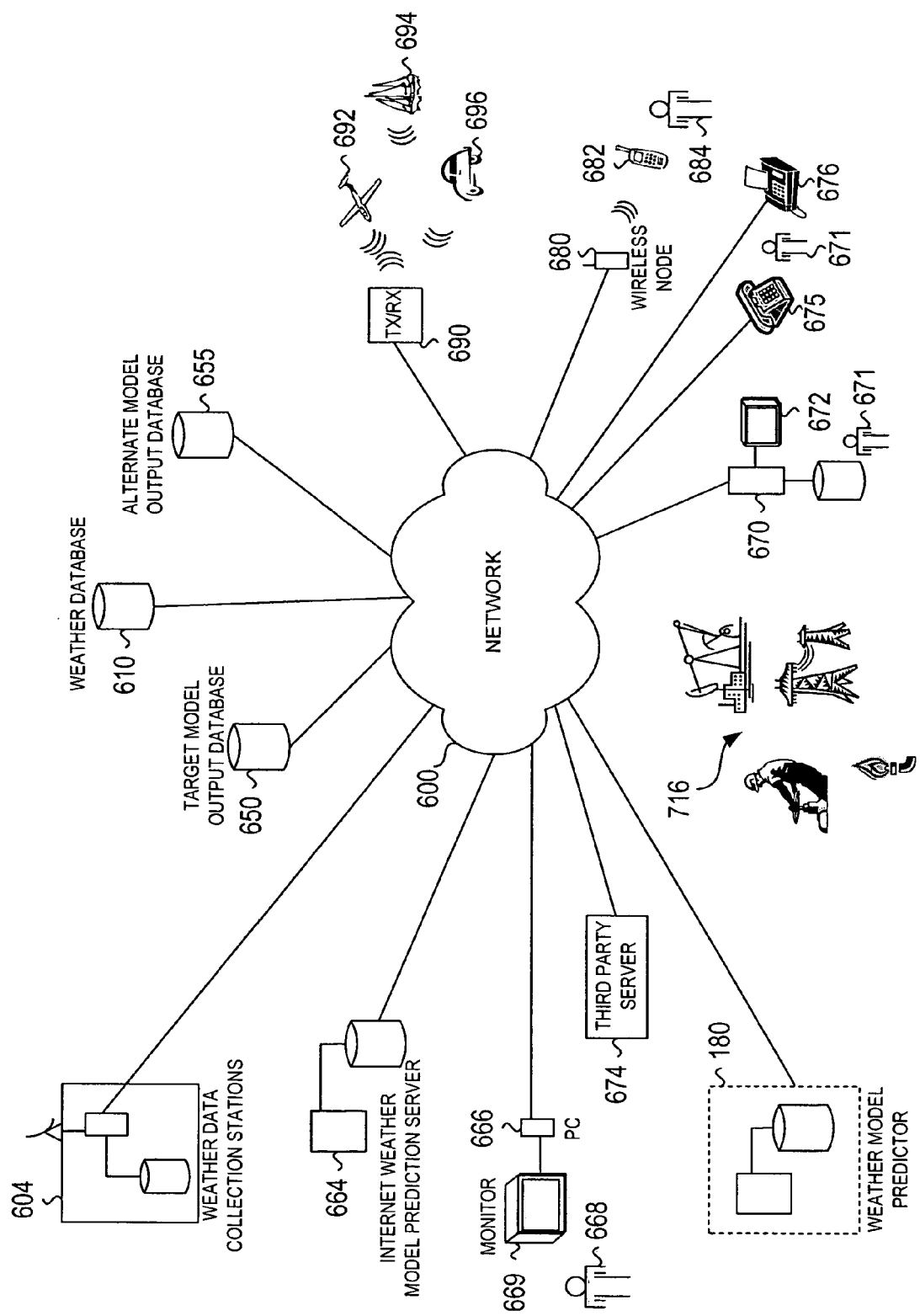
FIG. 7 is a network diagram that includes the weather model predictor of FIG. 1.

FIG. 7 is a network diagram that includes the weather model predictor 180. Weather data collection centers 604 obtain data related to weather phenomena and other ground and atmospheric conditions at various locations (not shown) including, among other systems, satellite imagery centers that receive data from satellites, surface weather observation stations, lightning detection systems, and/or radar processing stations. Such weather-related data may be transferred over a variety of public and/or private wired and wireless networks 600 generally known in the art, including the Internet, to one or more weather databases 610.

Previously gathered and/or analyzed data may be present in one or more weather databases 610. Additional data may also be gathered from vehicles or mobile transmitters/receivers, including aircraft 692, ships 694 and ground transportation 696, along with information regarding their locations. Vehicles may transmit, receive, or transmit and receive to and from one of a system of transmitters and receivers 690. The system may also collect some types of data from mobile users 684 using handheld or portable devices 682 via a wireless network 680. Such data may include one or more of weather-related data, imagery, video, audio, or related position information. Data from each source may be produced in different formats.

In one embodiment, one or more data sources, including the weather databases 610, the target model output database 650, and the alternate model output databases 655 provide information, including relevant target and alternate model output data, over the network 600 to the weather model predictor 180. Such information may be provided in any format or protocol generally known in the art, including an extensible markup language format. The weather model predictor 180 provides future predictions of a weather model output as previously described to the subscriber 671 or user 668.

The future predictions of a weather model output or other data or information produced by the weather model predictor 180 may reside on a PC or server, or distributed servers (not shown). It could use commercial or open source database platforms such as Oracle, Microsoft SQL Server, MySQL, or PostgreSQL. The weather model predictor 180 may provide external communication through database connections, custom interfaces, or a web application server, or any other communications medium or system generally known in the art.

In one embodiment, the weather model predictor 180 provides future predictions of a weather model output updates to a subscriber system 670 used by a subscriber 671. Examples of subscribers include commodity traders, financial brokers, television or network broadcasters or any other entity or service interested in obtaining prediction(s) of a future weather model output. The subscribers 671 may or may not pay a fee for access to or otherwise obtaining the predicted future weather model output. In one embodiment, the data transfers could be accomplished using the transfer of extensible markup language (XML) data. The future predictions of a weather model output are viewed by the subscriber 671 using software and hardware tools 672 to navigate through graphical and/or textual display of the future predictions of a weather model output and other weather related information supplied by the weather model predictor 180. The information may also be received as an e-mail or instant message indicating qualitative and quantitative information about the predicted model output.

Figure 5:
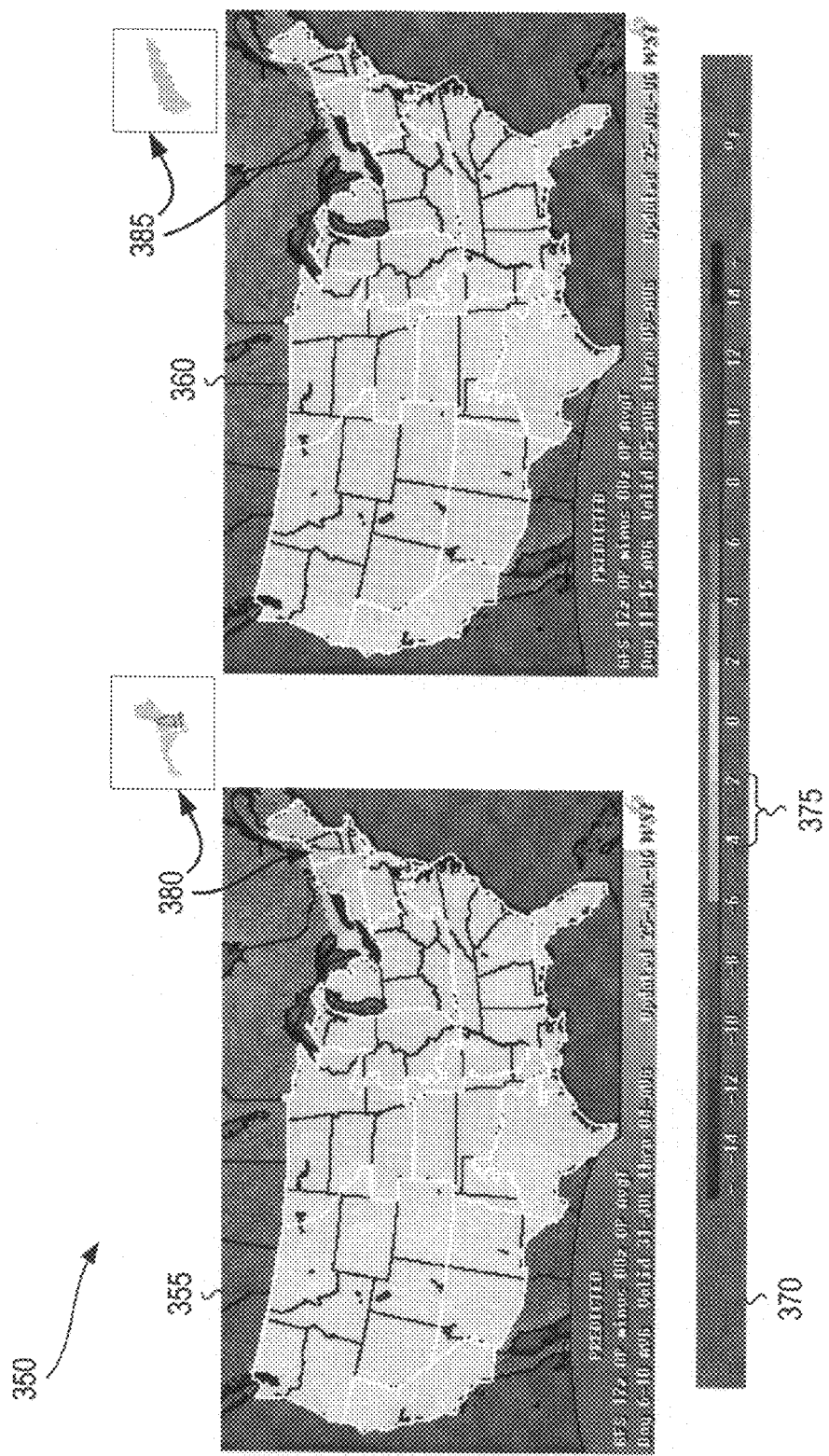
FIG. 5 is an example of a display in accordance with the weather model predictor of FIG. 1.

The information may be displayed graphically showing the differences between the predicted model output and the previous model output to aid the subscriber in rapidly assessing any changes in the predicted future conditions predicted by the weather model predictor 180. FIG. 5 is an exemplary display 350 of an output from the weather model predictor 180 showing the predicted change of temperature across the United States in the morning GFS Model (initialized at 1200 UTC) relative to the overnight run of the GFS Model (initialized at 0000 UTC). The map 355 on the left of display 350 is for the aggregate 6-10 day forecast period (i.e., an average of the $6^{th}$ through $10^{th}$ days of the forecast period of the model), while the map 360 on the right of display 350 is for the aggregate 11-15 day forecast period. It is understood by one skilled in the art that display 355 is not limited to the aggregate forecast periods shown in FIG. 5, and may include any aggregate forecast period, for example, the aggregate 4-7 day forecast period. The display may also include a single day forecast period, for example, the $9^{th}$ day of the forecast period. The color scale 370 allows for rapid identification of geographic areas for which the weather model predictor predicts changes. For example, the region 380 on map 355 and the region 385 on map 360 show the predicted change in magnitude of the temperature (−4 to −2 degrees, labeled 375) over their respective forecast periods in the identified regions.

In an embodiment, future predictions of a weather model output can be provided to subscribers 671 via voice communication and/or conventional telephone service or devices 675, including facsimile machines 676. Information can also be received by the subscriber on a handheld or portable device 682, such as cell phone or PDA.

Portions or all of the future predictions of a weather model output may be transferred to an Internet or networked weather model prediction server 664. The weather model prediction server 664 may be a simple PC, a web server, a combination of separate web server, application server, and database server, or other arrangement of server resources. The Internet weather model prediction server 664 could provide future predictions of a weather model output over the network 600 to other network systems or to PCs 666 with attached monitors 669 displaying Internet browsers or other applications operated by users 668. The users 668 are similar to the subscribers 671, previously described. In another embodiment, the Internet weather model prediction server 664 is accessed by mobile users 684 of portable devices 682 via the wireless communication network 680.

The Internet weather model prediction server 664 could serve a web page containing both HTML and JavaScript code. The JavaScript code could periodically, or upon user interaction, obtain additional or more up-to-date the future predictions of a weather model output from the weather model prediction server 664 without reloading the web page. In one embodiment, the data is in extensible markup language form.

In another embodiment, future predictions of a weather model output from the weather model predictor 180 are also provided to Internet or network users 668. The future predictions of a weather model output could be presented via a web-based interface through an Internet browser or customer application on the users' PCs 666 to allow interactive exploration of current and forecasted weather model prediction information. A user 668 could enter the URL of a weather model prediction server 664. The server could attempt to distinguish the user's location from IP address information, from a previously stored browser cookie, or from user input.

The future predictions of a weather model output may also be provided by the weather model predictor 180 to a third-party server 674. In one embodiment, the subscriber 671 of the weather model predictor 180 could provide data to third-parties, who would then provide value-added analysis or repackaging of the data.

In one embodiment, data from the weather model predictor 180 is used by third-parties to provide value-added services. For example, a search engine operator may provide recent weather data results and future predictions of a weather model output in response to weather-related keywords. For instance, an Internet search for "natural gas demand New England" could produce a map of current and/or predicted temperatures in the New England states, along with information related to the future predictions of a weather model output for natural gas demand. The graphical results could be provided with regions responsive to further user input, allowing the user to trigger display of additional information about a commodity 716. The search could be conducted on data transmitted to the search engine provider's database, or via calls to the Internet weather model prediction server 664 or similar resource provided on the network 600.

Figure 6:
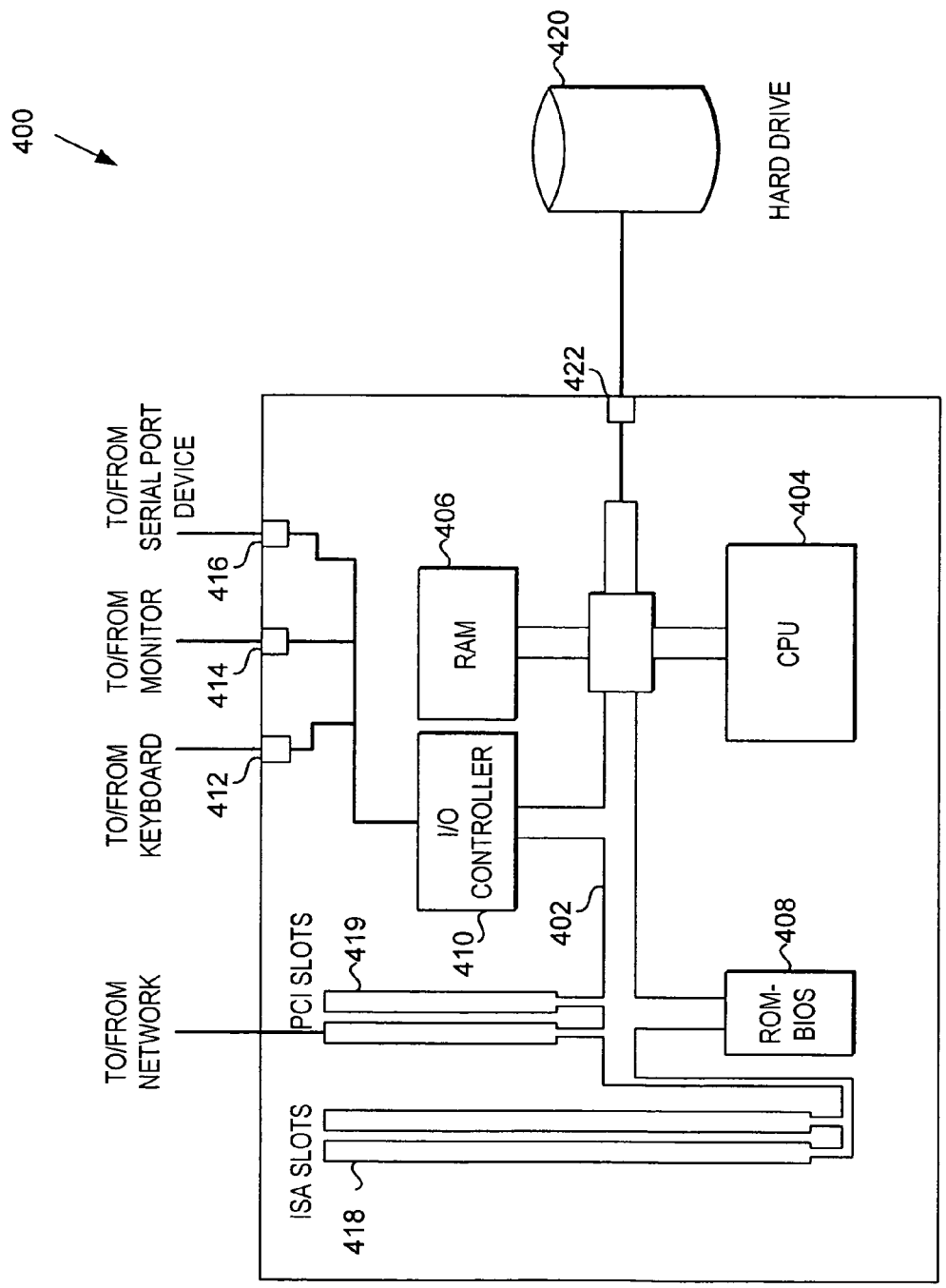
FIG. 6 is a block diagram of a computer system for realization of the weather model predictor of FIG. 1.

FIG. 6 is a block diagram of a computer system 400 for a realization of the weather model predictor 180 in accordance with an embodiment of the present invention. A system bus 402 transports data amongst the CPU 404, the RAM 406, Read Only Memory—Basic Input Output System (ROM-BIOS) 408 and other components. The CPU 404 accesses a hard drive 420 through a disk controller 422. The standard input/output devices are connected to the system bus 402 through the I/O controller 410. A keyboard (not shown) is attached to the I/O controller 410 through a keyboard port 412, and a monitor (not shown) is connected through a monitor port 414. The serial port device (not shown) uses a serial port 416 to communicate with the I/O controller 410. Industry Standard Architecture (ISA) expansion slots 418 and Peripheral Component Interconnect (PCI) expansion slots 419 allow additional cards to be placed into the computer. In an embodiment, a network card is available to interface a local area, wide area, or other network. The computer system 400 shown in FIG. 6 can be part of the weather model predictor 180, or can be a processor present in another element of the network 600.

The embodiments of the present invention may be implemented with any combination of hardware and software. If implemented as a computer-implemented apparatus, the present invention is implemented using means for performing all or part of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

We claim:

1. A computer-implemented method of predicting by a first computer an output of a target predictive model, the method comprising:
    (a) receiving, by the first computer from a target model data source maintained by a second computer different than the first computer, a complete set of output data produced as a result of a first run of the target predictive model;
    (b) receiving, by the first computer from at least one alternate model data source maintained by a third computer different than the first computer, at least one additional complete set of output data, each additional complete set of output data produced as a result of a run of at least one alternate predictive model, wherein the at least one alternate predictive model identifies parameters related to the complete set of output data of the target predictive model; and
    (c) predicting, by the first computer, a future output expected to be produced as a result of a second run of the target predictive model utilizing a statistical analysis of the complete set of output data from the first run of the target predictive model and the at least one additional complete set of output data from the at least one alternate predictive model, wherein the predicting of the future output expected to be produced as a result of the second run of the target predictive model occurs without the first computer performing runs of the target predictive model and the at least one alternate predictive model, and without observable weather data being used by the first computer in the predicting of the future output.

2. The method of claim 1, further comprising:
    (d) displaying the predicted future output from step (c) on a display, wherein the display includes a visual indicator of the difference between the predicted future output and the output data of the first run.

3. The method of claim 1, wherein the target and alternate predictive models include weather models.

4. The method of claim 1, wherein the predicted future output includes a prediction of the direction of change of a subset of the output data produced as a result of the first run of the target predictive model.

5. The method of claim 1, wherein utilizing the statistical analysis includes output from a statistical model based on predictive patterns and statistical relationships between the output data from the target and alternate predictive models derived from output data produced as a result of previous runs of the target and alternate predictive models.

6. The method of claim 5, wherein the statistical model tracks an accuracy for each of the at least one alternate predictive models in predicting the output of a future run of the target predictive model by comparing previous outputs of the at least one alternate predictive model with previous outputs of the target predictive model.

7. The method of claim 6, wherein the accuracy of each of the at least one alternate predictive models in predicting the output of the future run of the target model is accounted for in the statistical model using variable factors.

8. The method of claim 5, wherein variable factors are used in the statistical model to minimize the difference between the predicted future output and actual output data produced as a result of the second run of the target predictive model.

9. The method of claim 8, wherein the variable factors include weighting coefficients.

10. The method of claim 1, wherein the future output expected to be produced as a result of the second run of the target predictive model is predicted by the first computer before the start of the second run of the target predictive model.

11. The method of claim 1, further comprising:
    (d) evaluating a change in at least one of a future price and a future demand for a financial instrument based on the future output expected to be produced as a result of the second operational run of the target predictive model predicted in step (c); and
    (e) initiating a business transaction based on the evaluated change in the at least one of the future price and the future demand for the financial instrument, wherein the business transaction is initiated prior to the completion of the second operational run of the target predictive model.

12. A computer-implemented method of predicting by a first computer an output of a target weather model, the method comprising:
    (a) receiving, by the first computer from a first data source maintained by a second computer different than the first computer, a set of current output data produced as a result of a first operational run of the target weather model;
    (b) receiving, by the first computer from a second data source maintained by a third computer different than the first computer, at least one additional set of output data, each produced as a result of a run of at least one alternate weather model, wherein the at least one alternate weather model identifies parameters related to the set of current output data of the target weather model; and
    (c) predicting, by the first computer an output expected to be produced at a future time as a result of a second operational run of the target weather model based on the set of current output data and the at least one set of additional output data, wherein the output expected to be produced at the future time is obtained by the first computer prior to the start of the second operational run of the target weather model and occurs without the first computer performing runs of the target weather mode and the at least one alternate weather model, and without observable weather data being used by the first computer in predicting the output.

13. The method of claim 12, further comprising:
    (d) transmitting the predicted output from step (c) to a user prior to the start of the second operational run of the target weather model.

14. The method of claim 12, further comprising:
    (d) displaying the predicted output from step (c) on a display, wherein the display includes a visual indicator of the difference between the predicted output and the set of current output data of the first operational run of the target weather model.

15. The method of claim 12, wherein the current set of output data includes predicted future weather conditions.

16. The method of claim 12, wherein the at least one additional set of output data includes predicted future weather conditions.

17. The method of claim 12, wherein the at least one additional set of output data is produced after the first operational run of the target weather model.

18. The method of claim 12, wherein the at least one additional set of output data is produced prior to the first operational run of the target weather model.

19. The method of claim 12, wherein the predicted output is obtained using a statistical model based on predictive patterns and statistical relationships between the output data from the target and alternate predictive models derived from output data produced as a result of previous runs of the target and alternate weather models.

20. The method of claim 19, wherein the statistical model tracks an accuracy for each of the at least one alternate weather models in predicting the output of a future operational run of the target weather model by comparing previous outputs of the at least one alternate weather model with previous outputs of the target weather model.

21. The method of claim 20, wherein the accuracy of each of the at least one alternate weather models in predicting the output of the future operational run of the target weather model is accounted for in the statistical model using variable factors.

22. The method of claim 19, wherein variable factors are used in the statistical model to minimize the difference between the predicted output and the set of current output data produced as a result of the first operational run of the target weather model.

23. The method of claim 22, wherein the variable factors include extended regional weather patterns.

24. A system comprising a first computer for predicting an output of a target weather model, the system comprising:
   a receiver configured to receive, from a first data source maintained by a second computer different than the first computer, a set of current output data produced as a result of a first operational run of the target weather model and to receive, from a second data source maintained by a third computer different than the first computer, at least one additional set of output data produced as a result of a run of at least one alternate weather model, wherein the at least one alternate weather model identifies parameters related to the set of current output data of the target weather model;
   a memory configured to store the set of current output data and at least one additional set of output data; and
   a processor configured to predict an expected direction of change of the set of current output data based on the at least one set of additional output data, wherein the expected direction of change is produced prior to the start of a second operational run of the target weather model, the processor predicting the expected direction of change independently of observable weather data, the target weather model, and the at least one alternate weather model.

25. The system of claim 24, further comprising:
   a transmitter for transmitting the expected direction of change to a user prior to the start of the second operational run of the target weather model.

26. The system of claim 24, further comprising:
   a display for displaying the expected direction of change.

27. The system of claim 24, wherein the expected direction of change is obtained using a statistical model based on output data from previous runs of the target and alternate weather models.

28. An article of manufacture for predicting an output of a target weather model, the article of manufacture comprising a computer-readable medium holding computer-executable instructions for performing a method comprising:
   (a) receiving, by a first computer from a first data source maintained by a second computer different than the first computer, a set of current output data produced as a result of a first operational run of the target weather model;
   (b) receiving by the first computer from a second data source maintained by a third computer different than the first computer, at least one additional set of output data, each produced as a result of a run of at least one alternate weather model, wherein the at least one alternate weather model identifies parameters related to the set of current output data of the target weather model; and
   (c) predicting, by the first computer an output expected to be produced at a future time as a result of a second operational run of the target weather model based on the set or current output data and the at least one set of additional output data, wherein the output expected to be produced at the future time is obtained by the first computer prior to the start of the second operational run of the target weather model and occurs without the first computer performing runs of the target weather model, and the at least one alternate weather model, and without observable weather data being used by the first computer in predicting the output.

29. The article of manufacture of claim 28, the computer-executable instructions performing a method further comprising:
   (d) transmitting the predicted output from step (c) to a user prior to the start of the second operational run of the target weather model.

30. The article of manufacture of claim 28, the computer-executable instructions performing a method further comprising:
   (d) displaying the predicted output from step (c) on a display, wherein the display includes a visual indicator of the difference between the predicted output and the current set of output data of the first operational run of the target weather model.

31. The article of manufacture of claim 28, wherein the at least one additional set of output data is produced after the first operational run of the target weather model.

32. The article of manufacture of claim 28, wherein the at least one additional set of output data is produced prior to the first operational run of the target weather model.

33. The article of manufacture of claim 28, wherein the predicted output is obtained using a statistical model based on predictive patterns and statistical relationships between the output data from the target and alternate predictive models derived from output data produced as a result of previous runs of the target and alternate weather models.

34. The article of manufacture of claim 33, wherein variable factors are used in the statistical model to minimize the difference between the predicted output and the set of current output data produced as a result of the first operational run of the target weather model.

35. The article of manufacture of claim 34, wherein the variable factors include extended regional weather patterns.

36. The article of manufacture of claim 33, wherein the statistical model tracks an accuracy for each of the at least one alternate weather models in predicting the output of a future operational run of the target weather model by comparing previous outputs of the at least one alternate weather model with previous outputs of the target weather model.

37. The article of manufacture of claim 36, wherein the accuracy of each of the at least one alternate weather models in predicting the output of the future operational run of the target weather model is accounted for in the statistical model using variable factors.

38. A computer-implemented method of providing information related to a target predictive model, the method comprising:
(a) obtaining, by a first computer from a first data source maintained by a second computer different than the first computer, first output data produced as a result of a first run of the target predictive model;
(b) predicting, by the first computer, second output data expected to be produced as a result of a second run of the target predictive model prior to completion of the second run of the target predictive model; and
(c) providing, by the first computer prior to the start of the second run of the target predictive model, a comparative indication of the second output data expected to be produced as a result of the second run of the target predictive model with respect to the first output data produced as a result of the first run of the target predictive model, wherein the predicting of the second output data expected to be produced as a result of the second run of the target predictive model occurs without the first computer performing runs of the target predictive model and without observable weather data being used by the first computer in the predicting of the future output.

39. The method of claim 38, wherein the second output data includes a prediction of an expected direction of change of the first output data.

40. The method of claim 38, wherein the predicting in step (b) includes using the first output data from the first run of the target predictive model and at least one set of additional output data from runs of at least one alternate predictive model, the target model and the at least one alternate predictive model being weather models.

41. The method of claim 40, wherein the second output data is obtained using a statistical model based on predictive patterns and statistical relationships between the output data from the target and alternate predictive models derived from output data produced as a result of previous runs of the target predictive model and the at least one alternate predictive model, wherein the statistical model tracks an accuracy for each of the at least one alternate predictive models in predicting output of a future run of the target predictive model by comparing previous outputs of the at least one alternate predictive model with previous outputs of the target predictive model.

42. The method of claim 38, wherein the comparative indication includes a visual representation of the direction of change of the second output data with respect to the first output data.

43. The method of claim 38, wherein the comparative indication represents a prediction of an actual direction of change corresponding to actual output data obtained from the completion of the second run of the target predictive model.

44. The method of claim 38, wherein the comparative indication is used in evaluating a change in at least one of a future price for a financial instrument and a future demand for a commodity.

45. The method of claim 38, wherein the comparative indication is used to facilitate a business transaction prior to the completion of the second run of the target predictive model for a least one of a financial instrument and a commodity.

46. The method of claim 38, wherein the target predictive model is the Global Forecast System model, and the second run of the target predictive model is a 1200 UTC morning operational run of the Global Forecast System model.

47. The method of claim 38, wherein the comparative indication is provided to a subscriber in an email message.

48. A system comprising a first computer for providing information related to a target predictive model, the system comprising:
means for obtaining, from a first data source maintained by a second computer different than the first computer, first output data produced as a result of a first run of a target predictive model;
means for predicting second output data expected to be produced as a result of a second run of the target predictive model prior to completion of the second run of the target predictive model; and
means for providing, prior to the start of the second run of the target predictive model, a comparative indication of the second output data expected to be produced as a result of the second run of the target predictive model with respect to the first output data produced as a result of the first run of the target predictive model, wherein the predicting of the second output data expected to be produced as a result of the second run of the target predictive model occurs without the first computer performing runs of the target predictive model and without observable weather data being used by the first computer in the predicting of the future output.

49. The system of claim 48, wherein the means for predicting includes using the first output data from the first run of the target predictive model and at least one set of additional output data from runs of at least one alternate predictive model, the target and alternate predictive models being weather models.

50. The system of claim 49, wherein the means for predicting includes using a statistical model based on predictive patterns and statistical relationships between the output data from the target and alternate predictive models derived from output data produced as a result of previous runs of the target predictive model and the at least one alternate predictive model, wherein the statistical model tracks an accuracy for each of the at least one alternate predictive models in predicting output of a future run of the target predictive model by comparing previous outputs of the at least one alternate predictive model with previous outputs of the target predictive model.

51. The system of claim 48, wherein the comparative indication includes a visual representation of an expected direction of change of the second output data with respect to the first output data.

52. The system of claim 48, wherein the comparative indication represents a prediction of an actual direction of change corresponding to actual output data obtained from the completion of the second run of the target predictive model.

53. The system of claim 48, wherein the target predictive model is the Global Forecast System model, and the second run of the target predictive model is a 1200 UTC morning operational run of the Global Forecast System model.

* * * * *